United States Patent [19]

Rose

[11] 4,289,355
[45] Sep. 15, 1981

[54] ATTACHMENT FLANGE FOR FLEXIBLE CONDUIT

[75] Inventor: Bobby H. Rose, Phoenix, Ariz.

[73] Assignee: Gold King Mfg. Co., Phoenix, Ariz.

[21] Appl. No.: 104,107

[22] Filed: Dec. 17, 1979

[51] Int. Cl.³ .............................................. B03B 5/00
[52] U.S. Cl. ........................................ 299/9; 37/58; 209/498; 285/192; 285/219; 285/DIG. 4
[58] Field of Search ................ 285/DIG. 4, 158, 192, 285/219, 220, 184, 390; 37/58; 299/9; 209/497, 498, 499, 500

[56] References Cited

U.S. PATENT DOCUMENTS 2,899,216  8/1959  Brock ...................... 285/DIG. 4 X
3,910,837  10/1975  Good ........................... 299/9 X

FOREIGN PATENT DOCUMENTS 533871  12/1921  France ............................. 285/158
522224  3/1955  Italy ................................ 285/184
14567  of 1895  United Kingdom ............. 285/192
255552  7/1926  United Kingdom ............. 285/158

Primary Examiner—Thomas F. Callaghan
Attorney, Agent, or Firm—Don J. Flickinger

[57] ABSTRACT

A plate is attachable to a supporting structure such as a wall. Means carried by the plate encircle and hold a flexible conduit passing through the plate and the structure. The conduit is detachably held at adjustably selected positions along the length thereof.

4 Claims, 5 Drawing Figures

U.S. Patent Sep. 15, 1981 4,289,355
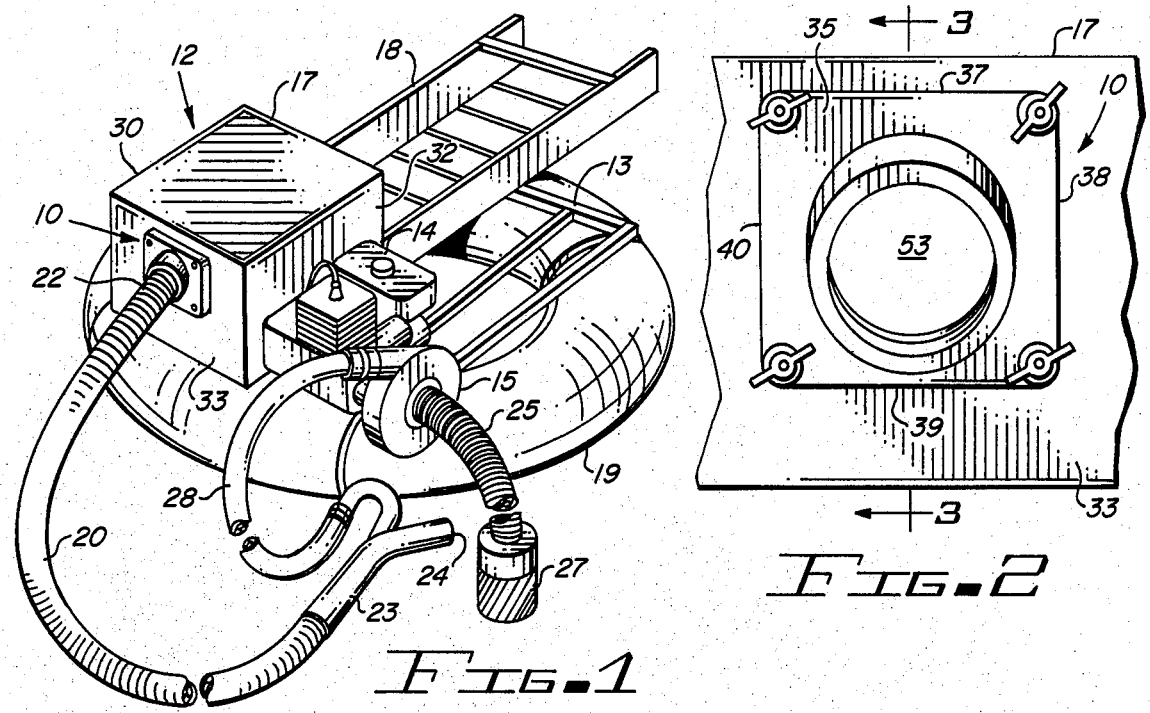
FIG-1
FIG-2
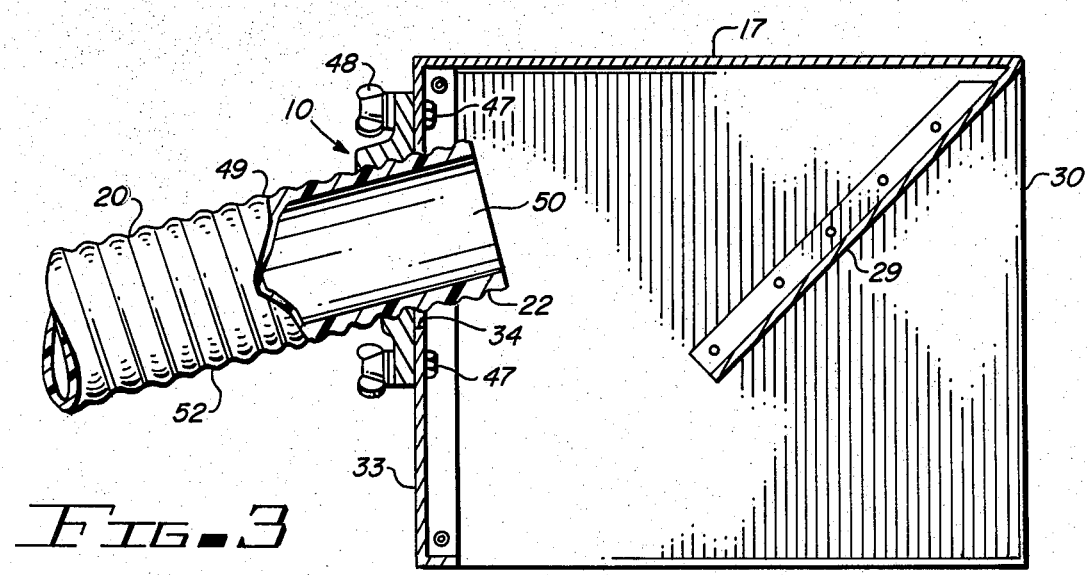
FIG-3
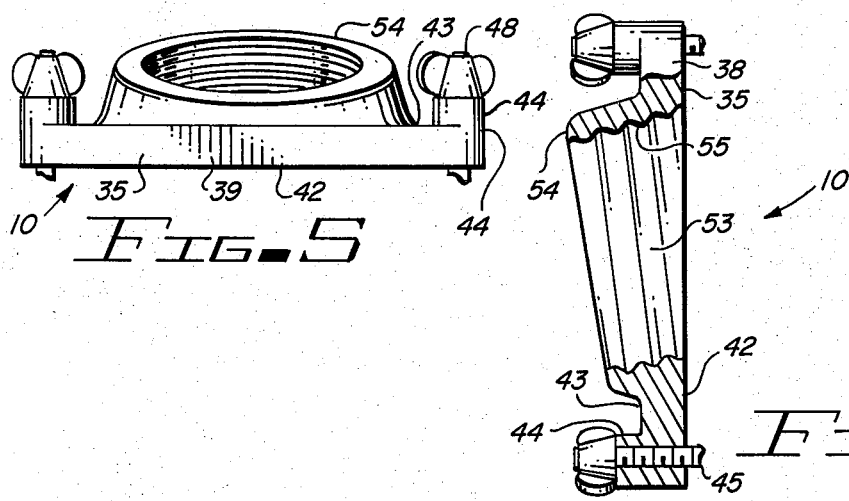
FIG-5
FIG-4

ATTACHMENT FLANGE FOR FLEXIBLE CONDUIT

BACKGROUND OF THE INVENTION

1. Field of the Invention

This invention relates to fittings and connections for use in connection with flexible conduits.

In a further aspect, the present invention relates to connector means for attaching a flexible conduit to a wall or other structure.

More particularly, the instant invention concerns an improved flange for adjustably and detachably holding a flexible conduit.

2. Description of the Prior Art

Flexible conduits are commonly employed to conduct a stream of fluid from one location to another. On occasion, the stream comprises a homogeneous fluid such as air, water, specific gases or liquids of various viscosity. At other times, the fluid acts as a medium for particulate matter entrained in the stream.

Frequently, it is necessary to connect an end of a flexible conduit to a structure which communicates with the bore of the conduit. The structure can be positioned either at the inlet end or the outlet end of the conduit. The structure may be, for example, a tank from which the fluid is supplied or a receptacle into which the fluid is deposited. In accordance with conventional practice, a tubular projection, such as a nipple, is affixed to a wall or other surface of the structure. An opening corresponding to the bore of the tubular projection is formed through the structure. The end of the conduit is passed over the projection, the outside diameter of which usually approximates the diameter of the bore of the conduit. A hose clamp or other device is used to secure the connection.

The foregoing arrangement effectively connects and seals a flexible conduit to a structure. However, this arrangement has not proven to be entirely satisfactory in certain instances. The bore of the projection being smaller than the bore of the conduit, especially with conduits which are not elastically expansive, represents a stricture which impedes the flow of fluid in either direction. When situated at the outlet end of the conduit, the end of the projection represented by the wall thickness thereof, intercepts the stream and presents an impingement for entrained particles.

The foregoing discussion is especially pertinent to material moving and handling devices, such as dredges, wherein water is used as a medium for moving a heterogeneous earthen mixture. Exemplary and chosen for purposes of discussion is the commercially available surface dredge manufactured and distributed by Gold King Manufacturing, Incorporated, Phoenix, Arizona. The device is particularly adapted for recovering precious metals, such as gold, from stream beds or other submerged locations.

The primary machinery of the dredge including an engine, a pump and a sluice box is affixed to an inflated inner tube, pontoons, or other suitable float structure. Extending therefrom is a suction hose having a nozzle at the inlet end for drawing in water and vacuuming up silt, sand, rock, etc. The outlet end of the suction hose is attached to an inverted box-like structure. The heterogeneous liquid stream being discharged from the hose is impinged upon a downwardly directed target plate which more or less evenly distributes the incoming material to the upper end of the sluice box.

Conventional means for connecting the outlet end of the vacuum hose to the box-like structure having proven to be highly unsatisfactory. The stricture caused by the presence of the attaching nipple within the bore impedes movement of the stream, placing an additional load upon the engine and the pump. More importantly, however, particulate material becomes lodged against the end of the nipple resulting in curtailed flow. This necessitates frequent temporary cessation of the operation while the machine is partially disassembled to remove the blockage.

Additionally, the fixed distance from the outlet end of the hose to the target plate decreases the efficiency of the machine. For optimum operation involving uniform distribution of the material to the sluice box, it is desirable that the distance from the outlet end of the hose to the target plate be variable in accordance with the viscosity of the fluid mixture as determined by the composition of the stream bed.

For the foregoing and other related applications, it would be highly advantageous therefore to remedy the deficiencies inherent in the prior art.

Accordingly, it is an object of the present invention to provide improved means for connecting a flexible conduit to a structure.

Another object of the invention is the provision of improved attachment means which will not obstruct the bore of the conduit.

And another object of the invention is to provide an improved attachment flange which is readily securable to a wall or other structure.

Still another object of the instant invention is the provision of a flange having means engagable with the outer surface of a flexible conduit.

And still another object of the invention is to provide an attachment flange which receives a flexible conduit therethrough.

Yet still another object of the invention is the provision of a flange which will hold a flexible conduit at adjustably selected positions along the length thereof.

A further object of the immediate invention is to provide an attachment flange for supporting a flexible conduit passing through the structure to which the flange is affixed.

And a further object of the invention is the provision of means for readily adjusting the position of the outlet end of a flexible conduit relative the structure through which the conduit passes.

Yet a further object of the invention is to provide a flange as above in which the position of the conduit is readily and directly adjustable without tools or secondary operations.

And yet a further object of the invention is the provision of a flange of the above type which is durably, yet simply and inexpensively manufactured.

SUMMARY OF THE INVENTION

Briefly, the objects of the instant invention are achieved by providing a flange having attachment means for securement to a supporting structure and connection means for receiving a flexible conduit and holding the conduit at adjustably selected positions therealong. More specifically, the attachment means includes a plate having a surface for bearing against the supporting structure. Conventional fastening devices, such as rivets or bolts, are passed through the plate and the supporting structure.

In accordance with an immediately preferred embodiment of the invention, the connection means includes a bore extending through the plate and an opening formed in the supporting structure. Holding means within the bore are securable with the outer surface of the conduit. The length of the bore is increased by a boss projecting from the plate. For use in connection with a specific type of hose having an encompassing helical projection, the holding means takes the form of a mating helical projection formed within the bore.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective view of a typical surface dredge modified by an improved flange constructed in accordance with the teachings of the instant invention;

FIG. 2 is an enlarged fragmentary portion of the apparatus of FIG. 1 especially illustrating the flange of the instant invention, the flexible conduit illustrated in FIG. 1 being removed for purposes of clarity of illustration;

FIG. 3 is a vertical sectional view taken along the line 3—3 of FIG. 2 and especially illustrating the attachment of the flange of the instant invention to a supporting structure and the connection between the flange and a flexible conduit;

FIG. 4 is an enlarged side view partly in elevation and partly in section of the flange of FIG. 2; and FIG. 5 is an enlarged bottom plan view with respect to the illustration of FIG. 4.

DESCRIPTION OF THE PREFERRED EMBODIMENTS

Turning now to the drawings in which like reference characters indicate corresponding elements throughout the several views, attention is first directed to FIG. 1 which illustrates a flange, generally designated by the reference character 10, constructed in accordance with the teachings of the instant invention as it would appear when used in connection with a surface dredge generally designated by the reference character 12. Dredge 12 includes frame 13 upon which is supported engine 14 drivingly engaged with pump 15 and inverted box-like structure 17 located at one end of sluice box 18. Frame 13 rests upon inflated inner tube 19 which functions as a pontoon or float.

Flexible conduit 20 having outlet end 22 communicating with the interior of box-like structure 17 terminates at the free end with a nozzle 23 providing inlet end 24. Hose 25 having filter 27 at the free end thereof communicates with the vacuum side or inlet of pump 15. Hose 28 communicates between the discharge side or outlet of pump 15 and nozzle 23.

In use, float 19 supports dredge 12 upon the surface of a stream or other body of water. Filter 27 is submerged and in response to pump 15 draws water through hose 25. The water is discharged under pressure through hose 28 into nozzle 23 in the direction of outlet end 22 of flexible conduit 20. Accordingly, a vacuum is created at inlet end 24. As the inlet end 24 is passed over the bed of the stream, sand, silt, rocks and hopefully precious metals such as gold is drawn into flexible conduit 20 in response to the previously noted vacuum. The water, acting as a medium, carries the particulate matter through flexible conduit 20 for discharge through outlet end 22 within box-like structure 17.

As more specifically illustrated in FIG. 3, a downwardly directed target plate 29 extends between side walls 30 and 32 of structure 17 above one end of sluice box 18. The stream of water and particulate matter entrained therein discharged from inlet end 24 of flexible conduit 20 is impinged upon target plate 29 which tends to disperse the material along the length thereof. Accordingly, material falling from plate 29 is substantially evenly distributed to sluice box 18.

The front wall 33 of box-like structure 17 which forms a supporting structure for flange 10 has an opening 34 through which flexible conduit 20 passes. The distance from wall 33 to target plate 29 is fixed. Although not specifically illustrated, it will be appreciated by those skilled in the art, that presently commercially available devices of the immediate type incorporate a nipple or tubular projection extending outwardly from wall 33 at the location of opening 34. Outlet end 22 of flexible conduit 20 encompasses the nipple and is secured thereto by a hose clamp or other conventional fastening device. In addition to providing a stricture within flexible conduit 20, the nipple provides an abuttment against which particulate matter can be lodged. The situation is particularly acute when bulky material such as bits of brush, twigs and leaves are passed through the conduit. Further, target plate 29, which is substantially planar is set at a compromised distance, being at a greater than optimum distance from opening 34 for receiving a highly viscous stream having substantial quantities of mud, silt or large rocks and being at too close a distance for receiving streams of lesser viscosity. The present invention provides a remedy for these and other deficiencies of the prior art as will become apparent presently.

Dredge 12 is considered to be typical of commercially available dredges and is set forth herein for environmental purposes to illustrate an exemplary use for the flange of the instant invention. Applications for the device of the instant invention will readily occur to those skilled in the art to which the instant invention pertains.

Generally stated, flange 10 of the instant invention includes attachment means for securing the device to a supporting structure such as wall 33 and connection means for receiving and holding a flexible conduit such as conduit 20. In accordance with a preferred embodiment of the invention, the attachment means includes plate 35 which, as chosen for purposes of illustration in FIG. 2, is generally rectangular as defined by sides 37, 38, 39 and 40. Plate 35, as further illustrated in FIGS. 4 and 5, has a thickness corresponding to the distance between rear surface 42 which is adapted to abut wall 33 and front surface 43. A boss 44 projects from front surface 43 proximate each corner defined by the respective sides 37, 38, 39 and 40. An aperture 45 extends through plate 35 at each boss 44. A bolt 47 passes through each aperture 45 and a corresponding aperture (not herein specifically illustrated) in wall 33. For purposes of ease of assembly, a wing nut 48 is threadedly engaged with each bolt 47.

The flexible conduit 20 chosen for purposes of illustration, includes an outer cylindrical surface 49 and a coaxial bore 50. Helical projection 52 encompasses outer surface 49. Flexible conduit of the immediate type fabricated of plastic is commercially available under the tradename Kanaflex.

Attachment means for receiving and holding flexible conduit 20 includes generally centrally located bore 53 extending through plate 35 between surfaces 42 and 43. The length of bore 53 is increased by boss 54 projecting from front surface 43. Bore 53 is sized to receive outer surface 49 of flexible conduit 20 therethrough. Helical indentation 5 carried within bore 53 matingly receives helical projection 52. Bore 53 is oblique with respect to parallel surfaces 42 and 43.

With particular attention to the illustration of FIG. 3, it is apparent that flange 10 holds conduit 20 without obstructing bore 53. It is equally apparent that attachment or detachment of conduit 20 to structure 17 is accomplished without secondary operations, such as loosening a hose clamp, or without tools such as a wrench or a screwdriver conventionally used for such operations. In accordance with the conventional right-hand spiral of a helix, right-hand rotation of flexible conduit 20 relative to flange 10 engages conduit 20 within bore 53 and, alternately, left-hand rotation will disconnect conduit 20 from flange 10. Rotation of conduit 20 is also employed to advance or retract conduit 20 relative wall 33 and thereby position outlet end 22 at the desired distance from target plate 29. The foregoing advantages of ease of assembly and disassembly and the convenience of readily positioning the flange at selected locations along the length of conduit 20 offers advantages which are useable in other situations for attaching a flexible conduit or hose to a supporting structure as will occur to those skilled in the art.

Various modifications and variations to the embodiment of the invention herein chosen for purposes of illustration will readily occur to those skilled in the art. For example, the bolts and nuts utilized to secure flange 10 to wall 33 are readily replaceable by other fastening means such as rivets. The axis of bore 53 may reside at any selected angle, including perpendicular, to the surface of the flange. Further, while the preferred embodiment of the invention is molded or cast of aluminum, other material such as plastic or ferrous metals are contemplated. To the extent that such modifications and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. In a dredge having a pump; a sluice box; a distributor box having a front wall, a target plate fixedly mounted in the distributor box, said target plate substantially evenly distributing into the sluice box water and solids entrained in the water which impinge the target plate; and a flexible conduit having an inlet end and an outlet end, said conduit having an outer surface having a helical projection, said conduit being operationally connected to the pump; the improvements comprising:
   a flange mounted on said front wall of the distributor box, said flange having a bore sized to receive a flexible conduit within it, said bore having a helical indentation to receive the helical projection of the flexible conduit, the outlet end of said flexible conduit being threaded into the bore of the flange;
   a bore through the front wall of the distributor box sized and positioned so that the outlet end of the flexible coupling can project into the distributor box; whereby the distance between the outlet end of the flexible conduit and the target plate can be varied by rotating the conduit relative to the flange.

2. In the dredge as defined in claim 1, wherein the bore of the flange has an axis, and said axis forms an oblique angle with the front wall 3. In the dredge as defined in claim 1 in which the front wall of the distributor box has an inner and outer surface, said flange being mounted on the outer surface of the front wall.

4. In the dredge as defined in claim 2, in which the target plate is substantially planar and is mounted in the distributor box at an angle to the front wall.

* * * * *